Feb. 9, 1971  A. S. RINGROSE  3,562,758
DEVICE AND METHOD FOR MAKING A TEMPORARY INSCRIPTION
Filed March 19, 1968
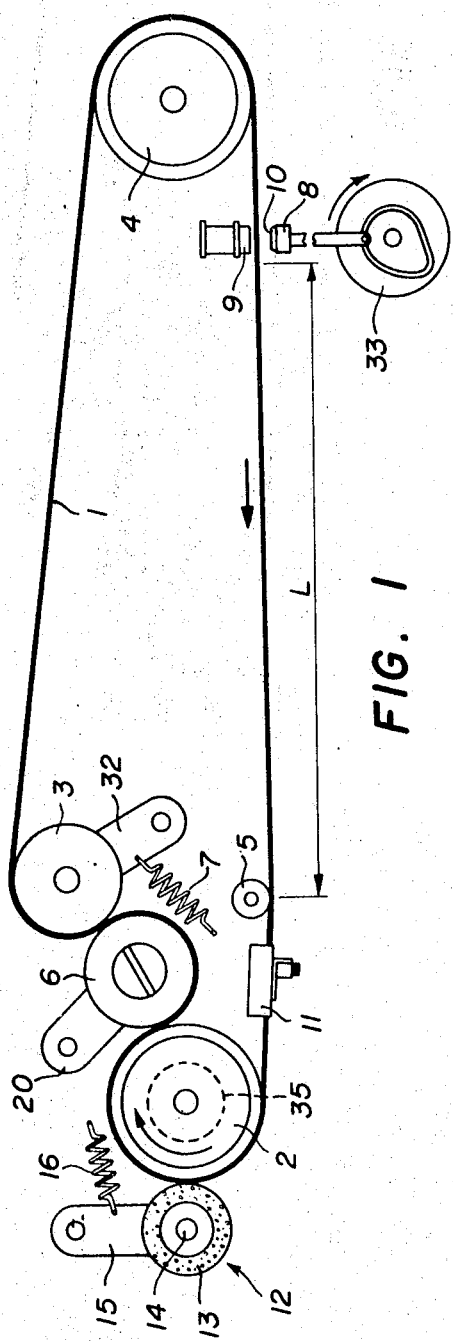
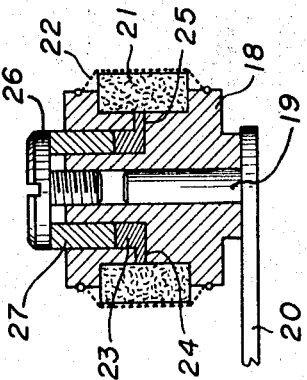
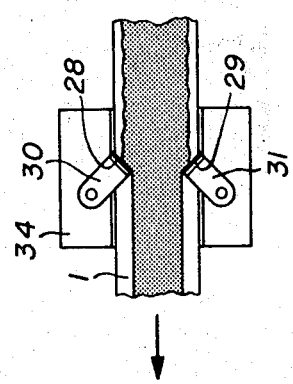
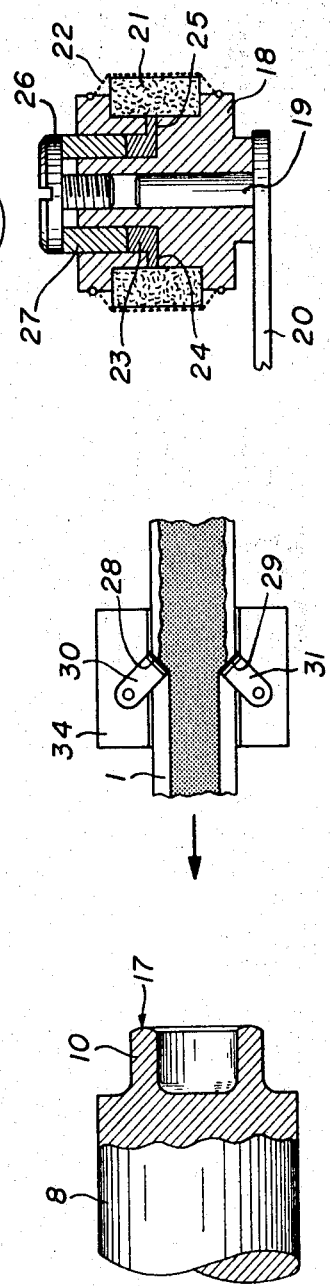

United States Patent Office 3,562,758
Patented Feb. 9, 1971

3,562,758
DEVICE AND METHOD FOR MAKING
A TEMPORARY INSCRIPTION
Anthony Stephen Ringrose, Geneva, Switzerland, assignor to Ing. C. Olivetti & C. S.p.A., Ivrea, Italy, an Italian company
Filed Mar. 19, 1968, Ser. No. 714,195
Claims priority, application Switzerland, Apr. 25, 1967, 7,377/67
Int. Cl. G01d 9/22
U.S. Cl. 346—21                  9 Claims

ABSTRACT OF THE DISCLOSURE

The invention provides a device and a method for making temporary inscriptions on a regeneratable support consisting of a band having a dark-coloured surface on which is applied a layer of light-coloured paste, by pressing selected characters carried by one or more impression members through the paste as the band moves along to expose areas of the dark-coloured surface corresponding to the outline of the selected characters, the paste in these areas being chased sideways by the characters and the imprints being subsequently erased by rollers which even out the layer in readiness for a further inscription.

---

This invention relates to a device and to a method for making a temporary inscription.

According to the present invention there is provided an inscription device which comprises a mobile inscription support having a dark-coloured smooth endless surface intended to be covered over at least part of its width with a thin layer of light coloured paste unaffected by air, an impression member carrying a raised character, drive means for producing relative movement between said support surface and said impression member whereby one moves past the other, actuating means for pressing said impression member against said support surface and for subsequently moving said impression member away therefrom whereby, upon application of said layer, said raised character is driven through said layer to clear an area of said dark coloured surface and is then withdrawn from said layer to leave in said area a visible imprint of said character, and erasing means for subsequently erasing said imprint by evening out said layer of paste.

The invention further provides a method of making a temporary inscription, which comprises the steps of pressing an inscription member against a dark-coloured smooth surface to drive a raised character, carried by said instription member, through a thin layer of light-coloured paste unaffected by air carried by said surface thereby to clear an area of said dark-coloured surface, moving said pressing an insription member against a dark-coloured impression member away from said surface to withdraw said raised character from said layer thereby to leave in said area a visible imprint of said character, and evening out said layer of paste to erase said imprint.

In the accompanying diagrammatic drawings:

FIG. 1 is a plan view of a preferred embodiment of the inscription device provided by the invention;

FIG. 2 shows, in partial axial section and on an enlarged scale, a character-bearing member used in the device shown in FIG. 1;

FIG. 3 shows, in axial section and on an enlarged scale, one of the rollers visible in FIG. 1; and FIG. 4 is a front view, on an enlarged scale also, of a further detail of FIG. 1.

The device shown in FIG. 1 comprises an inscription support in the form of an endless band 1. The inner surface of the band passes over a drive roller 2, a tensioning roller 3, and idle roller 4 and a stabilizing roller 5, whereas the outer face of band 1 cooperates with two rollers 6 and 12, whose functions will be explained below. Rollers 3, 6 and 12 are respectively mounted on pivotal arms 32, 20 and 15 whereas rollers 2, 4 and 5 have stationary axes.

In the present embodiment, band 1 is made of synthetic rubber and has an outer surface which is black and which is covered, at least over the major portion of its width with a thin layer of white paste.

In operation of the device, the band thus covered with this paste passes, after having travelled over the idle roller 4, before a movable impression member 8 which bears a raised character 10, e.g. a letter or a numeral, and which is actuated by any suitable means, as for instance a cam device 33. Under the impulsion of the actuating means, such as 33, the member 8 is first pressed against the band 1 thereby bringing the free edges of character 10 to move through the paste carried by the band, the paste being locally displaced to clear an area of the dark outer surface of the band, whereupon the member 8 is withdrawn to reveal the cleared area corresponding to an imprint of character 10. To enable this inscription, the impression member 8 cooperates with a stationary member 9 providing a counter-surface located just behind the band 1.

Although only one impression member 8 has been shown to simplify the drawing, it will be understood that this member forms part of a plurality of impression members each bearing a different character in order that any desired text may be written on the band progressing in the direction of the arrow, each of these members being individually and selectively actuated, for instance by means of a mechanism similar to that of a typewriter.

The band 1, carrying the text thus written, is made to cross a reading zone L where the text may be read and checked by the operator. If the text has to be recorded in permanent manner, the band could for instance be stopped once it has travelled forward by a distance corresponding to about the length of zone L thereby enabling the text to be recorded, by suitable means, in successive sections.

Because the layer of paste has a tendency to migrate towards the edges of band 1, in particular under the penetration action of the characters being driven through the layer, the latter has to be returned to its initial width. To this end the band 1, upon leaving the reading zone L, is conveyed towards a scraping device 11 which can also be seen in elevation in FIG. 4. This device 11 comprises a block 34 which is formed with a groove occupied by the band and on which are mounted two blades 30 and 31 having upturned end portions to form, above the band, two lugs to which are secured flexible strips 28 and 29. These strips form between themselves an angle and are at right angles to the surface of the band 1 so as to act in the manner of a snowplow, the strips extending into the groove of block 34 in contacting relationship with the outer surface of band 1.

In order to reduce friction and/or wear, it is preferred to make the block 34 out of polytetrafluoroethylene and to use for the strips 28 and 29 a material identical to that of band 1.

Upon leaving the scraping device 11, the band 1 passes over the drive roller 2. In the present embodiment, roller 2 is mounted on the shaft of a stepper electric motor 35 so as to impart to the band a discontinuous movement, interrupted by stoppages during which member 8 is actuated to inscribe the character it carries, the actuating means 33 of member 8 being controlled by the motor 35 to ensure synchronisation between the movements of member 8 and the stoppages of band 1.

In the vicinity of drive roller 2, the outer surface of band 1 cooperates with erasing means which, in the present instance, are made up by the two rollers 6 and 12, roller 6 forming a main eraser and roller 12 forming an auxiliary eraser positioned upstream in relation to the main eraser and made here necessary by the discontinuous nature of the band motion. In this connection, it has been found that, in the absence of roller 12, the erasure of the inscriptions made on the band by member 8 was incomplete when the movement of the band was discontinuous and that a preliminary erasing operation had to be carried out. This preliminary erasing operation, while enabling the paste to be sufficiently evened out to fill the imprints left by character 10, is in itself insufficient also as it leaves transverse traces at regular intervals, these traces being caused by the successive stoppages of band 1.

The combination of these two rollers, which are here to some extent complementary of one another, enables the layer of paste to be given a smooth and uniform regenerated surface.

The erasing roller 12, which rotates freely about pin 14 mounted on pivotal arm 15, is fitted with a foam rubber sleeve 13 having a smooth and nonporous outer surface. Roller 12 is lightly urged into contact with band 1 by a spring 16 hooked onto arm 15.

Roller 6 not only fulfills an erasing function but also serves to distribute the paste and is therefore of more complex construction as can be seen from FIG. 3. This roller comprises a hub 18 removably mounted on an upstanding pin 19 secured to arm 20. The hub 18 is formed with a circumferential groove occupied by a felt annulus 21 having a diameter greater than that of hub 18. The annulas 21 is covered by a sleeve 22 made of fine fabric, e.g. nylon, the two ends of the sleeve 22 being secured to the hub 18. This sleeve 22 serves both to prevent the dispersion of fibres which break loose from the annulus 21 and to provide the layer of paste with the desired smooth surface.

To fulfill its paste distributing function, roller 6 comprises a reservoir in which is stored a quantity of white paste. This reservoir is formed by an annular cavity 23 which communicates with the bottom of the groove occupied by annulus 21 by means of a circular series of radial ports, such as ports 24 and 25. Cavity 23, which opens in the top side of hub 18, is closed off by an annular member 27 capable of sliding in cavity 23, thereby enabling it to act as a piston to eject, under the action of a screw 26, a metered quantity of paste towards the felt annulus 21 thus causing the latter to deposit a desired quantity of paste on band 1 through the fabric sleeve 22. The layer of paste on band 1 only being a few hundredths of a millimeter thick, the amount of paste stored in cavity 23 need only be quite small, for example about 1 to 2 ml. Screw 26 is only turned when the band 1 is moving and drives the roller 6 round. As long as screw 26 is not turned, roller 6 acts primarily as an eraser. Band 1 is normally only fitted into position in a bare condition and the paste is only subsequently applied.

To provide satisfactory erasure, it is desirable to have quite a large area of contact between the roller 6 and the pasted outer surface of band 1. To this end, roller 6 is positioned between rollers 2 and 3 thereby enabling the band to be wrapped around roller 6 over about 180°. Further, in order to prevent slip between band 1 and drive roller 2 at each forward step of the latter, it is also desirable to provide as large an area of contact between the roller 2 and the band 1. To achieve this, roller 6 is so positioned in relation to roller 2 that the plane passing through their axes forms a very small acute angle with the plane passing through the axes of rollers 2 and 4, thereby enabling band 1 to surround roller 2 over about 270°. The tensioning roller 3 is so urged by a spring 7, hooked onto arm 32, that band 1 may be applied with some force against roller 6 to squeeze the latter between rollers 2 and 3, thereby enhancing the evening action achieved with roller 6 and helping to minimise any slipping between band 1 and drive roller 2.

This arrangement of rollers 2, 3 and 6 moreover facilitates the removal and replacement of band 1. Because rollers 3 and 6 are mounted on pivotal arms, it suffices, in order to make such a change, to pivot arm 32 towards the idler roller 4 against the action of spring 7 thereby providing the band with some slack and freeing roller 6 so that arm 20 thereof can then in turn be pivoted anticlockwise. Te remove band 1, roller 3 can then be released with roller 6 remaining in its pivoted position as it is not spring loaded. The only component that then requires holding during the changing operation is roller 12. Because of the flexible nature of band 1, it may not be necessary to pivot blades 30 and 31 outwardly.

As is apparent from FIG. 2, character 10, carried by the impression member 8, represents the letter "O." This character has an outwardly and transversely curved surface 17 which is intended to come into contact with band 1. It has been found that when using a substantially flat surface for contacting a band made of rubber an energetic striking action and a relatively long (about 3 seconds) contact period between the character and the band were necessary in order to obtain good definition, this length of time being required to force out the small amount of paste trapped between the character and the band, the latter undergoing at the point of impact localised deformation of its outer face. Because of the outwardly curved shape given to surface 17, it becomes possible, on the one hand, to force the paste out sideways in a rapid and progressive manner while the character moves through the layer and, on the other hand, to avoid having any paste trapped between surface 17 and band 1 when they come into contact with one another, notwithstanding the localised deformation that occurs in the surface of the band, thus making is possible to achieve excellent character imprint definition. Moreover, it has been found that the length of contact time between the band and the character could be reduced to a time less than $\frac{1}{60}$ of a second and that the speed at which the character penetrates the paste is no longer of great importance to achieve such definition, with the result that there is a substantial increase in the speed of writing and that there is a substantial decrease in noise and of the wear on both the band and the characters. Experience has shown, even after inscribing and subsequently erasing the same character several million times over at the rate of twenty inscriptions per second, that legibility always remains excellent and that wear is negligible. The best results are obtained when the radius of curvature of surface 17 is constant over its entire length and is substantially equal to its width and when the band 1 made of synthetic rubber has a thickness of about 0.8 to 1 mm. and a Shore hardness of about 90°.

As for the paste, it must be unaffected by air. This paste preferably consists of a mixture of silicone oil and pigment in more or less equal parts by weight. By way of pigment, titanium dioxide is particularly suitable, but talc, zinc oxide and titanium hydroxide can also be used.

Because this composition renders the paste viscous, the speed at which a character is moved away from the band must be rather high to provide abrupt withdrawal of the character from the paste in order not to affect the inscription. A good definition can be had with a return speed of about 0.5 m./sec.

Various modifications can be made to the inscription device illustrated in the drawings by way of example. For instance, the inscription support can have substantially greater width in order to enable the inscription of several lines of writing parallel to or transverse to the direction of movement of the support. If desired, the support could consist of a synthetic rubber sleeve which is fitted onto a rotary cylinder and whereon the writing would form lines that are parallel to the axis of the cylinder. Further, all of the characters used in writing could be arranged on a common inscription member, such as a ball, with the latter possibly moving along the line of writing while the support is kept stationary.

The device described with reference to the drawings can be used in numerous cases where it is desired to write quickly but temporarily large amounts of information. A typical field of application for this device is that of computers. Because the recording of information issuing from computers often requires several kilometers of paper a day, the storage of this information has become problematic. To facilitate this storage all of the information written on paper has, in some instances, been recorded on micro-films in order that this paper may be destroyed. In these instances, as also in the rather frequent instances where it is desired to retain only part of the written information issuing from computers, the wastage can be enormous. Rapid inscription on a regeneratable support, such as can be achieved with the illustrated device, makes it possible to avoid this wastage in view of the temporary nature of the inscription and the regeneratable nature of the support, while enabling the information written on the support to be wholly or partly recorded in permanent manner on another suitable support.

Although the device described with reference to the drawings is the preferred embodiment, it is also possible to use by way of support, instead of the band 1 made of synthetic rubber, a band made of stainless steel having a thickness of about 0.075 mm., whose ends are welded by means of a plasma to form it into a closed loop and whose surfaces are darkened by electrochemical processes to provide the necessary contrast. In this instance, the surfaces of the characters, corresponding to surface 17 in FIG. 2, are flat.

Moreover, although a discontinuous movement of the band enables higher writing speeds to be achieved, it is also possible to impart to the band continuous motion by mounting roller 2 on the shaft of a constant speed motor.

I claim:

1. An inscription device comprising a mobile inscription support having an endless surface, means for selectively applying an exposed thin layer of paste on said support surface, an impression member provided with a raised character, drive means for moving said support surface relatively to said impression member, actuating means for pressing said impression member against said support surface and for subsequently moving said impression member away therefrom whereby, upon application of said exposed thin layer, said raised character is driven through said exposed thin layer and brought into direct contact with said support surface to clear an area of said surface and is then withdrawn from said exposed thin layer to leave in said area a visible imprint of said character, and erasing means including at least one roller engaging said support surface for subsequently erasing said imprint by evening out said layer of paste.

2. An inscription device according to claim 1, wherein said drive means includes a drive roller supporting said endless surface and a stepper motor actuating said drive roller for moving said support surface relatively to said impression member step by step, and wherein said actuating means is adapted for actuating said impression member between said steps.

3. An inscription device according to claim 1, wherein said support is elastic.

4. An inscription device according to claim 1, wherein said support is an endless band comprising synthetic rubber.

5. An inscription device according to claim 1, wherein said raised character includes an operative surface having a width, said operative surface being outwardly curved transversely of said width.

6. An inscription device according to claim 5, wherein said outwardly curved operative surface of said raised character has a radius of curvature substantially equal to the width of said operative surface.

7. An inscription device according to claim 1, wherein said erasing means includes two rollers, one roller being provided with a non-porous elastic surface normally in frictional engagement with said support surface, the other roller being provided with an annulus of porous material normally in frictional engagement with said support surface, a paste reservoir communicating with said annulus, and means for expelling a metered quantity of paste from the reservoir through the annulus, during motion of said support surface, thereby to apply said thin layer of paste onto said support surface.

8. An inscription device according to claim 1, including scraping means engaging said layer of paste to impart to said layer a constant boundary parallel to the direction of movement of said endless support surface.

9. An inscription device according to claim 7 including a first arm means pivotally supporting said first arm upon which first arm is mounted said other roller of said erasing means, said first arm being pivotally arranged externally of a closed loop defined by said endless support surface, a second arm, means pivotally supporting said second arm, a tensioning roller supported on said second arm, said second arm being pivotally arranged internally of said loop, an idle roller supporting said endless support surface internally of said loop, said other roller of said erasing means being interposed between said drive roller and said tensioning roller, means for biasing said tensioning roller against said other roller for biasing said other roller against said drive roller, said drive roller, said other roller, said tensioning roller, and said idle roller all being provided with axes arranged such that a line passing through the axes of said drive roller and said other roller forms an acute angle with a line passing through the axes of said drive roller and said idle roller, whereby said closed loop substantially surrounds said drive roller over 270° and surrounds said other roller over 180°.

References Cited

UNITED STATES PATENTS

| | | | |
|---|---|---|---|
| 1,681,460 | 8/1928 | Bruhn | 346—21 |
| 1,706,046 | 3/1929 | Tisdale | 346—21 |
| 3,011,854 | 12/1961 | Allen | 346—21 |
| 3,184,748 | 5/1965 | Muller et al. | 346—21 |
| 3,325,822 | 6/1967 | Heggen et al. | 346—136 |
| 3,358,149 | 12/1967 | Preikschat | 346—21 |
| 3,370,300 | 2/1968 | Gilovich et al. | 346—136 |
| 3,381,299 | 4/1968 | Yow-Jiun-Hu | 346—21 |
| 3,386,378 | 6/1968 | Bradbury et al. | 197—1 |
| 3,421,611 | 1/1969 | Spreter et al. | 346—21 |
| 3,434,153 | 3/1969 | Sonntag | 346—21 |
| 3,097,597 | 7/1963 | Visser | 101—147X |

ROBERT E. PULFREY, Primary Examiner

E.H. EICKHOLT, Assistant Examiner

U.S. Cl. X.R.

15—256.5; 101—93, 288, 292; 197—1; 346—135

UNITED STATES PATENT OFFICE
CERTIFICATE OF CORRECTION

Patent No. 3,562,758      Dated February 9, 1971

Inventor(s) Anthony Stephen Ringrose

It is certified that error appears in the above-identified patent and that said Letters Patent are hereby corrected as shown below:

In the heading to the printed specification, line 8, "April 25, 1967" should read -- May 25, 1967 --.

Signed and sealed this 17th day of August 1971.

(SEAL)
Attest:

EDWARD M. FLETCHER, JR.      WILLIAM E. SCHUYLER, JR
Attesting Officer      Commissioner of Patents